(12) United States Patent
Bernath (10) Patent No.: US 8,363,560 B2
(45) Date of Patent: Jan. 29, 2013

(54) SYSTEM AND METHOD FOR ENHANCED PROXY COMPONENT

(75) Inventor: Tracey Bernath, Leawood, KS (US)

(73) Assignee: Inceptia LLC, Brooklyn, NY (US)

( * ) Notice: Subject to any disclaimer, the term of this patent is extended or adjusted under 35 U.S.C. 154(b) by 1277 days.

(21) Appl. No.: 11/555,595

(22) Filed: Nov. 1, 2006

(65) Prior Publication Data

US 2008/0101340 A1    May 1, 2008

(51) Int. Cl.
*G01R 31/08* (2006.01)

(52) U.S. Cl. ...................................... 370/252

(58) Field of Classification Search .................. None
See application file for complete search history.

(56) References Cited

U.S. PATENT DOCUMENTS

| | | | |
|---|---|---|---|
| 5,722,067 A | 2/1998 | Fougnies et al. | |
| 5,912,882 A | 6/1999 | Yafuso et al. | |
| 5,983,099 A | 11/1999 | Yao et al. | |
| 6,157,823 A | 12/2000 | Fougnies et al. | |
| 6,785,252 B1 * | 8/2004 | Zimmerman et al. | 370/337 |
| 6,956,834 B2 * | 10/2005 | Stanwood et al. | 370/329 |
| 7,006,530 B2 * | 2/2006 | Spinar et al. | 370/468 |
| 7,170,863 B1 * | 1/2007 | Denman et al. | 370/260 |
| 7,617,337 B1 * | 11/2009 | Beck et al. | 710/11 |
| 7,634,568 B2 * | 12/2009 | McConnell et al. | 709/227 |
| 2003/0039242 A1 | 2/2003 | Moore | |
| 2003/0177245 A1 * | 9/2003 | Hansen | 709/228 |
| 2004/0224710 A1 * | 11/2004 | Koskelainen et al. | 455/518 |
| 2005/0122923 A1 | 6/2005 | Jang et al. | |
| 2005/0180394 A1 * | 8/2005 | Kautz et al. | 370/352 |
| 2005/0232241 A1 * | 10/2005 | Wu et al. | 370/352 |
| 2005/0237952 A1 * | 10/2005 | Punj et al. | 370/260 |
| 2005/0266859 A1 | 12/2005 | Tejani et al. | |
| 2006/0019655 A1 * | 1/2006 | Peacock | 455/426.1 |
| 2006/0019698 A1 | 1/2006 | Ahya et al. | |
| 2006/0023654 A1 | 2/2006 | Koren et al. | |
| 2006/0023747 A1 | 2/2006 | Koren et al. | |
| 2006/0026288 A1 | 2/2006 | Acharya et al. | |
| 2006/0030347 A1 * | 2/2006 | Biswaas | 455/518 |
| 2006/0046697 A1 | 3/2006 | Koren et al. | |
| 2006/0046756 A1 | 3/2006 | Kies | |
| 2006/0080344 A1 * | 4/2006 | McKibben et al. | 707/100 |
| 2006/0111134 A1 * | 5/2006 | Mills | 455/518 |
| 2006/0172754 A1 * | 8/2006 | Shin et al. | 455/518 |
| 2006/0205427 A1 * | 9/2006 | Laible et al. | 455/518 |
| 2006/0229093 A1 * | 10/2006 | Bhutiani et al. | 455/518 |
| 2006/0239267 A1 * | 10/2006 | Ryu | 370/392 |
| 2006/0280126 A1 * | 12/2006 | Shaffer et al. | 370/252 |
| 2007/0140150 A1 * | 6/2007 | Beck et al. | 370/279 |
| 2008/0032728 A1 * | 2/2008 | Patel et al. | 455/518 |

OTHER PUBLICATIONS

"Toward the all-IP Vision", OLSSON, ERICSSON—10 pgs, 2005.
"IP multimedia—a new era in communications", NOKIA Connecting People 12 pgs, 2004.
"IMS—Signalling & Control Enable New Classes of Services", Wermser et al., University of Applied Sciences Braunschweig/Wolfenbittel—12 pgs, 2005.
"IP Multimedia Subsystem (IMS) Service Architecture", Lucent Technologies—Bell Labs Innovations—Feb. 2005—12 pgs.
"IMS- IP Multimedia Subsystem: The value of using the IMS architecture", ERICCSON, White Paper Oct. 2004, 27 pgs.
"Mobile Technologies and their Evolution", Ermanno Berruto, Wind Telecomunicazioni S.p.A. Oct. 7, 2005, 31 pgs.

\* cited by examiner

*Primary Examiner* — Phirin Sam
*Assistant Examiner* — Faiyazkhan Ghafoerkhan (57) ABSTRACT

The present invention is directed to a system and method for use in a telecommunication networks to facilitate the use of packet switched end-user devices, particularly push-to-talk (PTT) devices, across multiple communication services and legacy networks. The present invention provides an enhanced proxy for integrated voice over internet protocol (VoIP) applications that enable predefined custom numbers to be utilized on a PTT device to access services on one or more legacy networks. The present invention also provides a means for the delivery of information that is dynamically customized and specific to an end-user of the PTT device.

24 Claims, 4 Drawing Sheets

SYSTEM AND METHOD FOR ENHANCED PROXY COMPONENT

The present invention is directed to an enhanced proxy device for use in telecommunication networks to facilitate the use of packet switched end-user devices, particularly push-to-talk (PTT) devices, across multiple communication services and legacy networks.

BACKGROUND OF THE INVENTION

Advances in communications systems and protocols have resulted in wide scale deployment of devices and networks having different technologies. A myriad of network service providers implement solutions that are customized and designed to take advantage of or promote features which may be inherent or unique to their network infrastructure. The demand for services by end users and the competition among providers, along with the rush to make services available to end users, superseded any cohesive effort by providers to implement a robust architecture. In general, there have been advancements in the type and nature of end user devices that are utilized by individuals and businesses alike. End user devices are blurring any distinctions that may have existed between data, speech and mobile technology. The desire and trend today is for real time, multi-media services which includes voice, video telephony, messaging, conferencing and push-to-talk services. To address this need, new mobile network infrastructures have been developed and adopted to allow the convergence of data, speech and mobile technology over an Internet Protocol (IP) based infrastructure. Importantly, these networks have been developed by multiple service providers. Nonetheless, users expect to be able to communicate with one another irrespective of the network that is serving them or other users.

Substantial investments have been made in legacy communication systems. It is impractical and extremely cost prohibitive for service providers to replace their infrastructures and systems to adopt any new architecture, regardless of how robust the newly introduced technology may be. It is also not economical, practical or efficient to re-invent services or functions for a new system, when they already exist on the legacy systems. As such, it is necessary to have a means for new architectures to interact or be integrated with legacy systems, so as to provide access to select legacy services or functions.

Recently for example, there has been some integration of wireless and landline network infrastructures. This integration has resulted in some additional services and functions for end users of the wireless and landline networks. One of the new services is the Push-to-talk (PTT) service. This service is also commonly referred to as Push-to-talk over cellular (PoC). In operation, PTT provides a one-to-one or one-to-many communication service in a mobile network. The communication connection is operatively half-duplex and is generally initiated by the push of a button on a client device, in a similar fashion to a walkie-talkie. Call connection with PTT service is generally less resource intensive than circuit-switched cellular services because resources are only tied up in one direction, for the duration of a caller's comment burst, rather than an entire call session. However, PTT lacks certain services which are available on other mobile networks and landline networks.

User demands for features and connectivity to other networks and devices led to the development of an industry protocol. The protocol, known as Session Initiation Protocol (SIP), provides the flexibility to use and control common technologies in enterprise networks. SIP is essentially a protocol for providing control or signaling that is used for establishing, modifying and terminating sessions in which there are one or more participating devices. SIP runs over different transport protocols and is independent of the media transport. A SIP session is created by an invitation from a calling device to a recipient device. The invitation carries session descriptions that allow intended participants to agree upon a set of compatible media types. A session may include Internet telephone calls e.g. Voice over IP (VoIP), voice calls, video calls, multi-media distribution, Instant Messaging (IM), teleconferencing or presence detection. SIP utilizes proxy servers to route invitations, identify a user's location, provide authentication for access to services, and implement provider routing policies, among other things. SIP is a widely accepted protocol by legacy land line providers for introducing services within the enterprise and providing services to mobile carriers.

PTT is a platform that can provide support for many functions and services beyond the traditional spontaneous voice communication. In order to provide additional functions and services in a complete and robust manner, it is necessary to have connectivity and continuity between wireless communications systems and land line communications systems such as the Internet or public switched Telephone Network (PSTN). Current platforms and architectures do not support certain services and certainly do not utilize the full extent of the communication resources that are implicated during PTT sessions or PTT service provisioning.

Accordingly, there exists a need for a manner of providing services from legacy networks to PTT devices. Even further, there is a need for providing services without additional overhead or resources. Further still, there is a need to utilize the unused portions of a communication bandwidth during a PTT session, to enable the provision of additional services and information that would further enhance the end user experience.

BRIEF SUMMARY OF THE INVENTION

In one aspect, the present invention is directed to providing Push-to-talk (PTT) endpoint devices with access to services or functions that are available on legacy communication networks, such as PSTN. The present invention provides an enhanced proxy for integrated VoIP applications between PTT endpoint devices and a multi-media architecture network.

In another aspect, the present invention further provides predefined unique custom numbers on a PTT endpoint device to access certain services or functions that are provided by legacy networks. The entry of a custom number or the selection of a menu item or icon, invokes a signal from an enhanced proxy to the multi-media network. The multi-media network in turn, requests the appropriate legacy service and provides a response to the PTT endpoint device.

In a further aspect, the present invention is directed to utilizing a PTT device as a delivery mechanism for information that is specific to an end-user of the PTT device.

In an even further aspect, the present invention enables bypass of legacy network devices and operations during communications between two or more registered PTT endpoint devices.

In another aspect, the present invention enables a user of an endpoint PTT device to rejoin a call and get caught up on what was missed.

In yet another aspect, the present invention provides detachment of PTT endpoint devices from traditional network devices, thus enabling features such as call waiting on a call from any system and between dissimilar networks.

The present invention provides an enhanced proxy through which all communications between the PTT endpoint device and a multi-media architecture network passes. Informational items about the end-user of the PTT device are obtained by the enhanced proxy and utilized to dynamically provide information that is customized for the end-user, including but not limited to a picture that may be provided as an attachment to other communication data; informational items pertaining to the end-user's profile or personal preferences; informational items pertaining to the end-user's current physical location; or targeted advertisements.

BRIEF DESCRIPTION OF THE DRAWINGS

The present invention is further described with reference to the accompanying drawings, which show a particular construction of the present invention. However, it should be noted that the invention as disclosed in the accompanying drawings is illustrated for the purpose of explanation only. The various elements and combinations of elements described below and illustrated in the drawings can be arranged and organized differently to result in constructions which are still within the spirit and scope of the present invention.

DETAILED DESCRIPTION OF INVENTION

The present invention is directed to an enhanced proxy device for use in a telecommunications network. The enhanced proxy facilitates the use of packet switched end-user devices, particularly push-to-talk (PTT) devices, across multiple communication services and legacy networks. End-users expect a wide variety of services and features in conjunction with the growing use and deployment of computing and communication devices. To address this need and further facilitate the integration of the multiple forms of information that must be processed and disseminated to varying endpoint devices, an infrastructure and architecture, comprising of both hardware and software components is implemented to support various service providers and third parties. The enhanced proxy of the present invention operates in such an environment. A simplified diagram of one such architecture is illustrated in FIG. 1.

Figure 1:
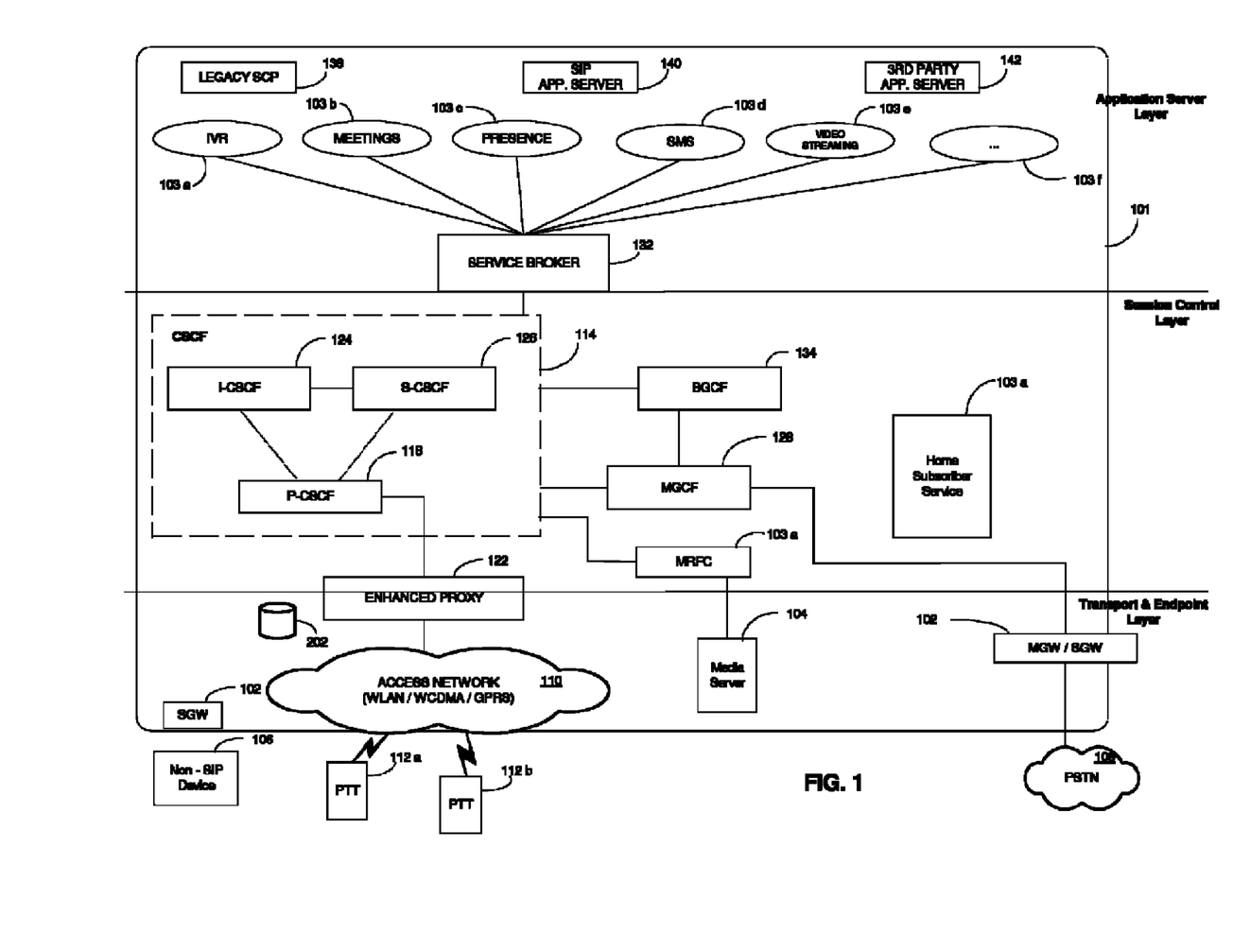
FIG. 1 illustrates a representative network infrastructure in which SIP may be used with a PTT device in accordance with the present invention.

Specifically, FIG. 1 depicts a representative architecture 100 with components for the implementation of the system and method of the present invention. As shown, the architecture 100 comprises a number of interconnected, disparate systems. The architecture 100 is a Third Generation Partnership Project (3GPP) network that supports the full breadth and depth of a service architecture, known as the Internet Protocol (IP) Multi-media Subsystem (IMS). IMS supports the requirements of the convergence of data, speech, and mobile network technology over an IP-based infrastructure. IMS provides a mechanism from bridging the gap between traditional telecommunications technology and internet technology, thus allowing operators and providers to offer new, innovative services that enrich end user experiences. A wide range of services 103a-103e are enabled on the IMS architecture by a flexible protocol known as Session Initiation Protocol (SIP). Specifically, there is support for Interactive Voice Response (IVR) 103a, online meetings 103b, presence 103c, Short Message Service (SMS) messaging 103d, and video streaming 103e, among others.

The IMS architecture as shown in FIG. 1 can be thought of as a collection of logical functions that are performed at three layers, namely a transport and endpoint layer; a session control layer; and an application server layer.

The transport and endpoint layer essentially initiates and terminates SIP signaling to setup and terminate sessions, while also providing services such as conversion of voice from an analog/digital source format to IP packets using Realtime Transport Protocol (RTP). This layer provides an infrastructure for the provision and management of services, and defines standard interfaces to common functionality including: configuration storage, identity management, user status such as presence and location, which is held by the Home Subscriber Server (HSS); billing services, provided by a Charging Gateway Function (CGF) (not shown); and control of voice and video calls and messaging, which are provided by the session control layer.

Specifically, the transport layer contains non-SIP device 106, a PTSN network 108, an access network 110 and PTT devices 112. The access network 110 is essentially the native connectivity environment/platform for particular end point devices and includes Wireless Local Area Network (WLAN), Wireless Carrier Detection Multiple Access (WCDMA), General Packet Radio Service (GPRS), etc. The transport layer also provides media gateways 102 and media servers 104. The media gateway 102 converts Voice over IP (VoIP) streams to the PSTN's Time Division Multiplexing (TDM) format. The media servers 104 provide a plurality of media related services including, announcement handling, speech recognition, conferencing, etc.

The session control layer sits between the transport/endpoint layer and the Application Server layer. It routes the call signaling, tells the transport plane what traffic to allow, and generates billing information for the use of the network. The session control layer comprises SIP proxies known as Call Service Control Function (CSCF) 114 that together with a Home Subscriber Service (HSS) 116 route any SIP request/message to the PTT devices 112, other networks, and network components. The core of this layer is the CSCF 114, which comprises a Proxy-CSCF (P-CSCF) 118, an Interrogating-CSCF (I-CSCF) 124, and a Serving-CSCF (S-CSCF) 126.

The P-CSCF 118 is the first point of contact for users within the IMS architecture. The P-CSCF 118 is responsible for security of messages between the network and the user. The P-CSCF 118 also handles allocation of resources for the media flows. The P-CSCF 118 relay SIP signaling between a user's terminal or endpoint device and the S-CSCF 126, and provides an access layer abstraction; and functions, such as a Breakout Gateway Control Function and Media Gateway Control Function, for inter-working between IMS and the legacy TDM and VoIP networks.

The I-CSCF 124 is the first point of contact from peered networks. The I-CSCF 124 is responsible for querying the HSS 116 to determine where a user should be registered (i.e. which S-CSCF).

The S-CSCF 126 is the central brain. The S-CSCF 126 is responsible for processing registrations to record the location of each user, user authentication, and call processing. Call processing here includes routing of calls to applications. The serving CSCF performs the basic session originating or terminating treatment for SIP messages. The operation of the S-CSCF 126 is controlled by policy stored in the HSS 116.

Having this distributed architecture provides a flexible and scalable solution. The CSCF 114 provides registration of endpoints and the routing of SIP signaling messages to appropriate application servers 120a, 120b or 120c. A service broker 132, which may be located within or external to the application servers 120a, 120b or 120c determines and initiates the appropriate service(s) or functions 130a-130e correlating to the signaling message. The Home Subscriber Server 116 (HSS) comprises a database that maintains the unique service profile for each end user including such information as IP address, roaming information, voicemail box options, etc. HSS 116 is the key repository for subscriber information and profiles. These profiles may be personalized to the individual subscriber's unique preferences for such attributes as feature behavior and call behavior. The HSS 116 delivers this personalized profile to different application servers in the network so that the subscriber has a single identity no matter what device they use to access the system.

The application server layer supports servers 120a, 120b or 120c that provide the end-user service logic. Third parties are also able to develop an application server 120c to handle specific services on the network 100. There may also be a separate SIP application server 120b. As previously described, the array of services 130a-130e are provided by the application servers 120a, 120b or 120c. Prior to the present invention, new or advanced services were implemented by equipping the network 100 with additional multi-media application servers 120a, 120b or 120c. However, the system and method of the present invention introduces an enhanced proxy 122 that functionally straddles the transport & endpoint layer and the session control layer and allows deployment and access to services without adding or reprogramming application servers 120a, 120b or 120c.

The enhanced proxy 122 is operationally located to receive all traffic flowing between endpoint devices, such as PTT handheld devices 112 and the CSCF 114 of the multi-media network 101. The enhanced proxy 122 is a multi-threaded application that receives SIP traffic and among other things, monitors values and modifies SIP fields if required, ignores RTP traffic, and provides Dual Tone Multi-Frequency (DTMF) and other legacy network services to the PTT devices 112.

A Media Control Gateway Function (MGCF) 128 is responsible for transferring and distributing media between participants in multi-media sessions. As shown, MGCF 128 is part of the multi-media network 101 and transfers media to the PSTN network 108, via a Media Gateway 102. A Breakout Gateway Control Function (BGCF) 134 is an element that selects the network in which PSTN 108 breakout is to occur. If the breakout is to occur in the same network as the BGCF then the BGCF selects a MGCF 128 that is then responsible for inter-working with the PSTN 108. The MGCF 128 then receives the SIP signalling from the BGCF 134.

Figure 2A:
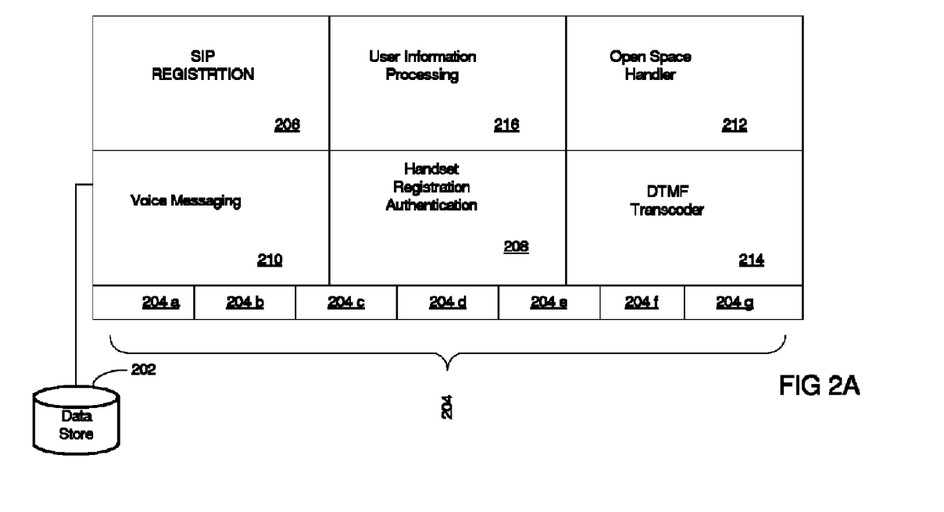
FIG. 2A is an illustrative block diagram of an exemplary enhanced proxy of the present invention.

Having described an exemplary environment for the present invention, focus is now directed to the details of the enhanced proxy 122. The block diagram of FIG. 2 illustrates components of the enhanced proxy 122. As shown, the enhanced proxy 122 comprises a storage device 202, a plurality of communication ports 204, a SIP registration component 206, a Registration/authentication component 208, a voice messaging component 210, an Open Space handler 212, a DTMF transcoder 206 and a User information processing component 216.

In operation, the enhanced proxy 122 handles all SIP related communications through a plurality of communication ports 204. As previously described, all SIP traffic to/from the PTT devices 112 pass through the enhanced proxy 122. The enhanced proxy 122 monitors the SIP traffic to determine if action is required in response to any of the message packets or if the packets should just be passed through. Various functions may be performed by the enhanced proxy 122 as a result of, or in response to, the monitored packets. These functions are best described with reference to the earlier identified components of the enhanced proxy 122.

To participate in the multi-media network 101, the enhanced proxy 122 must first be registered and identifiable to the devices of the network 110. The SIP registration component 206 handles registration of the enhanced proxy 122. The enhanced proxy 122 also registers each PTT device 112 that it will serve. The registration facilitates unique identification and information store for each PTT device 112 by the enhanced proxy 122. The registration and a subsequent authentication of PTT devices 112 are performed by the registration/authentication component 208. Once PTT devices 112 are authenticated, the enhanced proxy 122 handles SIP registration of the authenticated devices to the network 110, via the edge proxy 118. It is noteworthy that the SIP registration by the enhanced proxy 122 is transparent to the network 110. In other words, as far as the network is aware, each PTT device 112 registered itself individually on the network. The enhanced proxy 122 further represents each registered PTT device 112, to the network, even when the registered PTT device 112 is offline.

Registration of PTT devices 112 with the edge proxy 118 may be performed for multiple PTT devices 112, and may occur before any of the PTT devices 112 come online. In other words, the enhanced proxy 122 provides a form of pseudo registration of participating devices on the multi-media network 101. Importantly, the enhanced proxy 122 may register devices onto multiple multi-media networks 101, wherein each network 110 has different service providers, eg. Sprint, AT&T, etc. The enhance proxy thus detaches endpoint device such as PTT devices 112 from service provider networks or components.

Figure 2B:
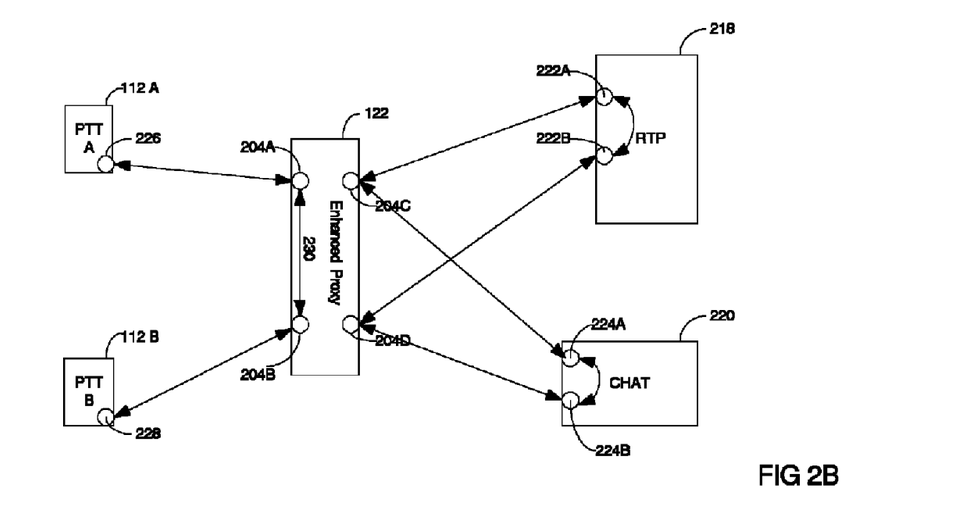
FIG. 2B is an illustrative block diagram of communications between the enhanced proxy of the present invention with other network components.

In an embodiment of the present invention, the enhanced proxy 122 provides network bypassing and direct communication among endpoint user devices. FIG. 2B illustrates the details of the previously described communication between a first PTT device 112A and a second device 112B, wherein the enhanced proxy 122 is located between the communication path of the devices 112A, 112B and an exemplary RTP module 218 of one service provider.

In operation, each PTT device 112A, 112B has an IP address IPA and IPB, corresponding to respective communication ports 226, 228. When a call is initiated from PTT device 112A, pertinent information including information about the originating IP address (IPA) and a destination IP address (IPB) are communicated to the enhanced proxy 122, the RTP module 218 and the destination PTT device 112B. As would be appreciated by one skilled in the art communication packets contain among other things a recipient port address and intermediate destination port addresses. To illustrate, PTT device 112A sends a request to communicate with PTT device 112B. The request packet is routed from port 226 to port 204A of the enhanced proxy 122 and from port 204C to port 222A on an RTP module 218 of a service provider. When all the necessary verifications and authentication are completed in the RTP 218, a connection link is then enabled via port 222B of the RTP module 218 through ports 204D and 204B of the enhanced proxy 122, to port 228 of the recipient PTT device 112B. The PTT devices 112A and 112B are then able to transfer packets back and forth. A similar process occurs with respect to a service provider's chat module 220, wherein communication with the chat module 220 occurs via ports 224A and 224B.

The enhanced proxy 122 by virtue of the pre-registration functionality that was previously described is able to quickly and without resorting to a communication with the RTP module 218 or Chat module 220, determine that recipient PTT device 112B is a registrant. As such, the proxy 122 can redirect communications directly from the initiating PTT device 112A to the recipient device 112B. The redirection occurs by replacing the relevant destination port address in the communication packet that would normally flow between port 204C and port 222A, In other words, when the call packets arrive at port 204A, because the devices 112A, 112B are registrants with the enhanced proxy 122, rather than pass the packet through the network to port 222A of the RTP module 218 via port 204C and so forth down the line, the packets are given a new destination of port 228 via port 204B, causing packets to be routed as shown by the path 230. In effect, the enhanced proxy 122 enables off network communications between registered devices 112A and 112B. The same scenario would be applicable to communications between endpoint devices that may be part of disparate legacy networks.

Returning to FIG. 2A, the voice messaging component 210 enables the enhanced proxy 122 to provide voice mail services for end-users. The detail of the voice messaging component is best described with reference to the flow chart 300 of FIG. 3.

Figure 3:
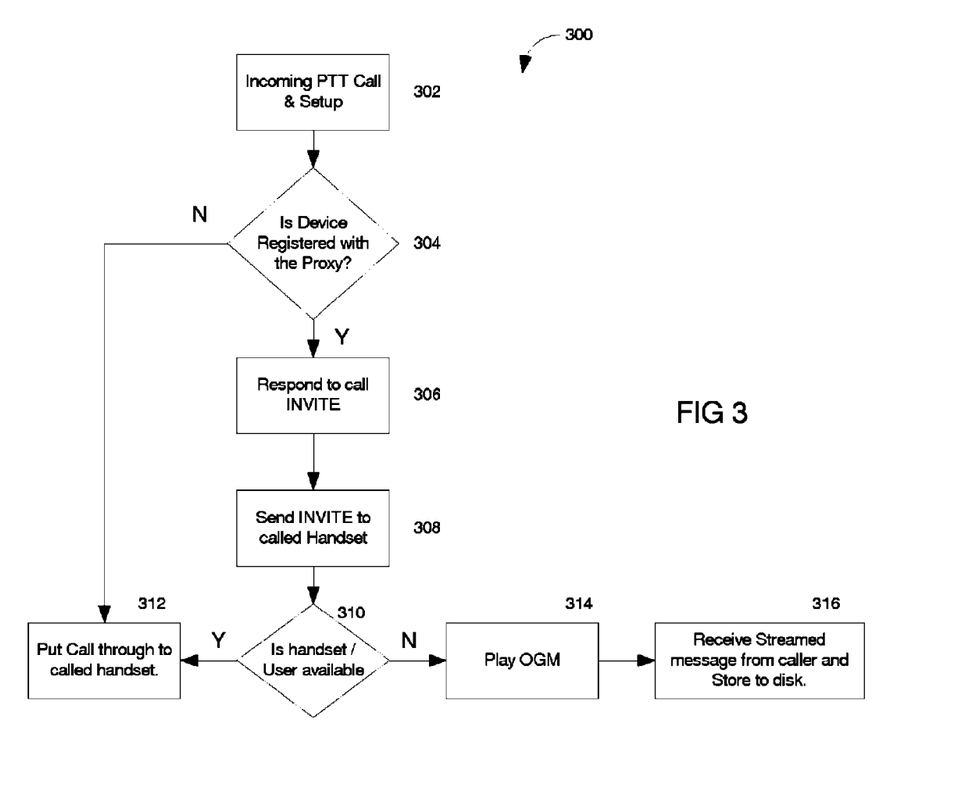
FIG. 3 is a flow chart of an exemplary process for providing voice mail service in accordance with the present invention.

Turning to FIG. 3, at step 302, the enhanced proxy 122 identifies an incoming call to a participating PTT device 112, i.e. a PTT device that was previously registered with the enhanced proxy 122. The PTT device 112 is then subsequently registered with the edge proxy 118. As previously described, the enhanced proxy 122 monitors all communications between all PTT devices 112 on the network 110 and the edge proxy 118. As with all SIP related communications, this incoming call is prefaced and signaled by an INVITE. Upon recognition of the INVITE, at step 304, a determination is made by the enhanced proxy 122, regarding the registration status of the intended or recipient PTT device 112. In the event that the recipient PTT device 112 is not registered, the enhanced proxy 122 acts as a pass-through device and the INVITE is passed through to the recipient PTT device 112, at step 312. If the end-user or PTT device 112 is unavailable when a pass-through occurs, the caller or initiating device gets a non-response, busy signal or other such unavailability indication that is typically provided by the multi-media network 101.

On the other hand, at step 306, a response to the INVITE signal is provided by the enhanced proxy 122, on behalf of any registered PTT devices 112. This representative response prevents the initiating device or user from receiving a typical network unavailability signal. After responding to the INVITE, the enhanced proxy 122 sends an INVITE of its own, to the recipient PTT device 112, at step 308. This INVITE determines the actual availability of the recipient end-user or intended PTT device 112, as ascertained at step 310.

If there is a response to the INVITE from the intended PTT device 112 and the end-user picks up the call, the caller and end-user are linked together and the enhanced proxy 122 proceeds to acts as a pass-through or conduit for the messages/signals of the call flow, at step 312. On the contrary, if there is no response from the end-user or the recipient PTT device 112 is not reachable, and an outgoing message (OGM) has been provided for the PTT endpoint device 112, such as a message previously recorded by the user or a default message provided by the system, the OGM is played to the caller, at step 314. If the caller chooses to leave a message, the message is streamed by the enhanced proxy 122 and stored on the storage device 202, at step 316. The call is then terminated at step 318.

This intermediary functionality as described and provided by the enhanced proxy 122 further enables the system of the present invention to provide call waiting for PTT devices. Specifically, the enhanced proxy 122 for example, upon detecting at step 310 that an endpoint device is in use, optionally provides a specialized tone or other indication to a user of the recipient PTT device 112 to signal a waiting call. Following a predetermined delay period or number of call waiting rings, the enhanced proxy 122 then proceeds to step 314, where the OGM is played and subsequently stored at step 316.

The recording of voicemail by the enhanced proxy 122 is sophisticated and provides for both quick storage and retrieval. Configuration information for voicemail is pushed to the PTT devices 112 from the enhanced proxy 122. The raw data packets that arrive from a PTT device 112 are directly stored to the storage device 202, with no additional overhead. That is to say, there is no processing of the payload or use of protocol stacks as is traditionally done within the IMS architecture. Instead, the headers of incoming streams are changed, rather than any transcoding or dismantling of the incoming data. As such, when the voicemail needs to be sent out or along to the ultimate destination, it is not necessary to reassemble or massage the message stream. This eliminates the need for media servers to handle voicemail related tasks. It also improves the efficiency of voicemail handling. Raw data packets are received by the enhanced proxy 122 and stored in their native form with not transcoding, interpretation of payload or otherwise.

The function of pseudo representation and capturing of raw data packets also enables the enhanced proxy 122 to provide conference call joining, rejoining and catch-up. For example when an end point device is intended to participate in a conference call, the enhanced proxy 122 is able to proxy for that device, join the call and record the ongoing session. In a similar manner if the end point device should become disconnected or otherwise, the enhanced proxy 122 can continue to record the session thereby allowing a user to rejoin the conference call at a later time without missing anything. In either of the modes described above, the system and method of the present invention provides to a user of a PTT device 112, the ability to then fast forward through the recorded information to catch-up to the real time session that may be on going. Similarly, a user may rewind, delete and perform other such functions that are typical of any media recording device. These functions may be implemented by entering particular number sequences on the PTT device 112, which are then interpreted and acted upon by the enhanced proxy 122.

Returning to FIG. 2, another component of the enhanced proxy 122 is the Open Space handler 212. The Open Space handler 212 provides connectivity and services to the PTT devices 112 from legacy telecommunications networks, such the PSTN network 108. In other words, the enhanced proxy 112 provides bridging services from PTT devices 112 to other telecommunications networks. In an embodiment of the present invention, the Open Space handler 212 traps and handles '400 codes', which are a standard set of status codes generated by the PSTN network.

Another component of the enhanced proxy 122 is the DTMF transcoder component 214. The transcoder 206 enables the enhanced proxy 122 to provide through custom numbers or selections on the PTT devices 112, access to services or functions that are part of a legacy network system. Such services or functions may include operator services, or voicemail access on the PSTN network. To illustrate, in an embodiment of present invention, a set of numbers are pre-assigned within the enhanced proxy 122 to correlate to specific services or functions on a PSTN network. For example, the number sequences 000-000-0000 and 111-111-1111 may be predefined as corresponding to a request for access to an operator and access to voicemail on the PSTN network, respectively. A means is provided on the PTT devices 112 to convey or trigger the appropriate number sequence on the enhanced proxy 122. As would be understood, by one skilled in the art, such means could include having an end-user of the PTT devices 112 key in the pre-defined sequence of numbers, or select a predefined key, symbol, or other indicia, which in turn signals the enhanced proxy 122 to request the corresponding PSTN service or function. The pre-assigned numbers may also be pushed out to the PTT devices 112 as part of a custom list from the enhanced proxy 122, whereby the user merely selects a service of interest.

Yet another component of the enhanced proxy, which is also illustrated in FIG. 2, is the User Information Processing component 216. In an embodiment of the present invention, this component of the enhanced proxy 122 provides, to PTT devices 112, information that is specifically targeted to the end users of the devices. In one instance, by utilizing information that is gathered from an end user's profile, such as musical interest or food interest, the enhanced proxy 122 is able to provide for example, an advertisement of an upcoming concert by a group or artist in a genre that matches that of the end user's interest. Similarly, the enhanced proxy 122 may provide a display of advertisements from restaurants that serve the particular foods that interest the end user. The end user's preference is determined on the basis of the end user's profile. End user profiles may reside locally on the PTT device 112 or remotely on the enhanced proxy 122 or the HSS 116.

In another instance, the enhanced proxy 122 may provide information that is specific to the real time locale of the PTT device 112. For example, an end-user from city 'A' that is partial to seafood arrives in City 'B'. The enhanced proxy 122 utilizes 'knowledge' of the user's food preferences and current location, as determined by querying the PTT device 112 or other similar methods, to provide a list of seafood restaurants that are in close proximity to the end-user. This aspect of the enhanced proxy 112 enables targeted advertising to end-users.

In an embodiment of the present invention, the silent communications that occur between the PTT devices 112 and the enhanced proxy 122 is transparent to the end-user and multi-media network 101. Silent communications occur passively during ordinary data flows between the PTT devices 112 and the multi-media network 101. In other words, the enhanced proxy 122 does not initiate or open a communication session to pass/receive information to/from the PTT devices 112. Rather, the enhanced proxy 122 senses when a device has already initiated a communication session and is 'online', then silent communications are conducted. Silent communications as used herein includes querying for or sending, information between the enhanced proxy 122 and the PTT devices 112. The silent communications occur using what may be termed the under-utilized portions of the bandwidth of the connection between the PTT device and the multi-media network 101.

Figure 4:
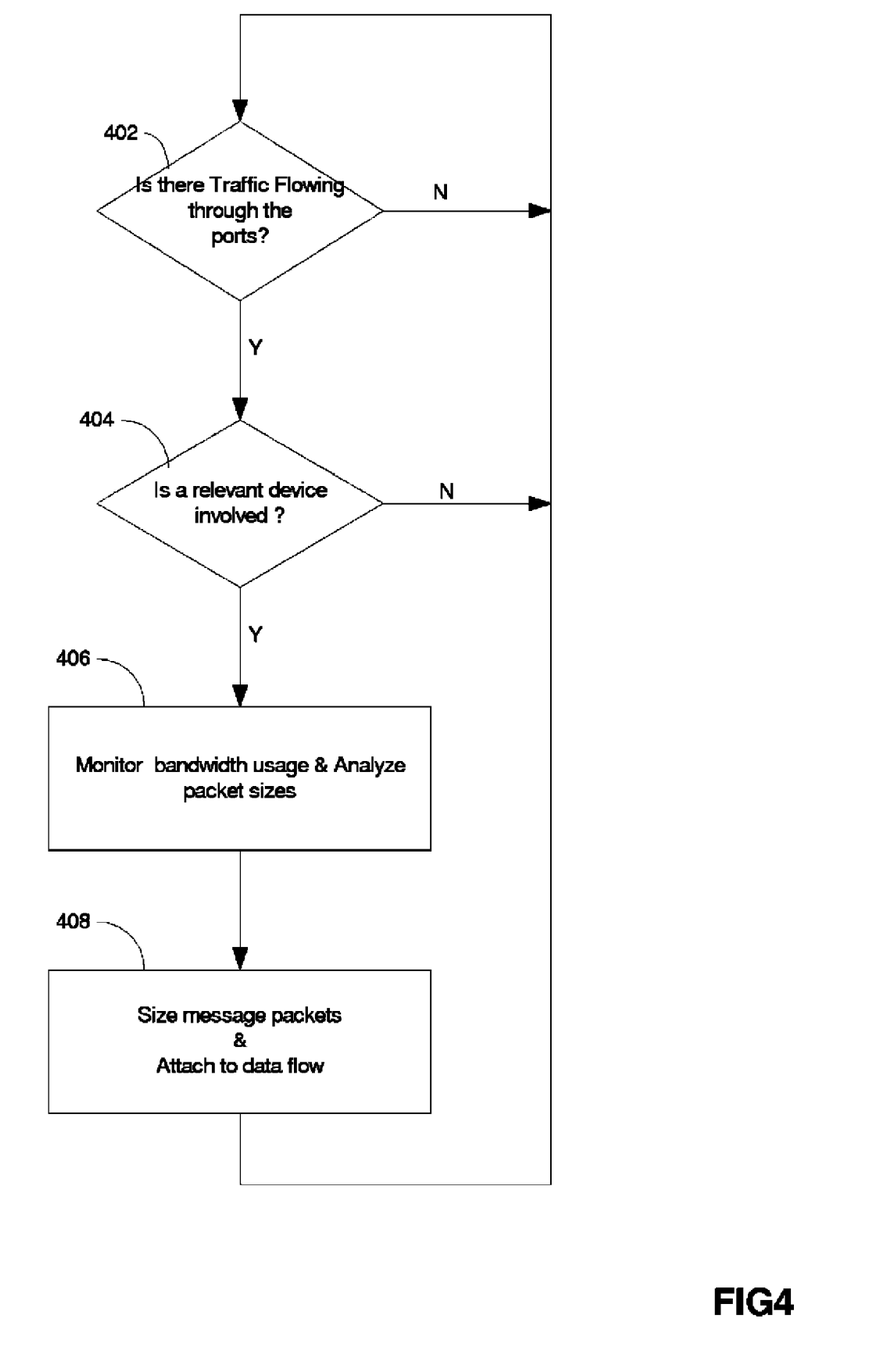
FIG. 4 is a flow chart of an exemplary process for communication on the unused portions of a PTT communication session in accordance with the present invention.

FIG. 4 illustrates an exemplary process flow 400 for the silent communication. The enhanced proxy 122 continuously listens for traffic at step 402. If there is no traffic, the monitoring simply continues. Conversely, if there is traffic, a determination is made at step 404, regarding whether or not such traffic involves a relevant device. More specifically, the inquiry is to determine if there is some information that the enhanced proxy 122 has for, or requires from, the communicating PTT device(s) 112. If there is no need to communicate with the PTT device(s) 112, processing returns to step 402, for continuous monitoring. On the other hand, if there is a need to communicate with the PTT device(s) 112, then the bandwidth utilization of the open communication channel is evaluated at step 406. Data request packets or data transfer packets are appropriately sized then attached to and forwarded along, with the ordinary data packets that flow between the enhanced proxy 122 and the PTT device 112, at step 408. The processing then returns to step 402 where the entire cycle is repeated.

In other words, when the enhanced proxy 122 recognizes that a PTT device 112 is a participant to a communication session, i.e., that there is some data exchange with the multi-media network 101, the enhanced proxy 122 utilizes that open connection to make requests from or push information to, the PTT device 112. Requested information for example could be recent changes to a user's profile, where those changes are stored on the PTT device 112. That information may be requested and transmitted during the idle portions of the open communication session. Similarly, any advertisements or new icons associated with services that are offered through the enhanced proxy 122, etc may be pushed to the PTT device 112 during idle portions of the session. The communication path between PTT devices 112 and the multi-media network 101 is a full duplex connection. However, by virtue of fact that PTT device user's take turns to speak and data is only flowing in one direction at any given time, the data traffic flow for ordinary PTT communications between any devices is ordinarily only half duplex. The enhanced proxy 122 of the present invention advantageously utilizes the full bandwidth of the full duplex connection path that exists during a session between PTT devices 112 and the multi-media network 101. The enhanced proxy 122 does so without impacting the call flow. Furthermore, by utilizing already established sessions, the system and method of the present invention avoids the need to take up resources or time that would be required to establish a separate communication session between the PTT device 112 and the multi-media network.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed is:

1. A method for providing to a Push-to-talk (PTT) endpoint device access to one or more services that are available on a legacy communication network, the method comprising:
providing an enhanced proxy for integrated voice over internet protocol (VoIP) applications through which all communications between the PTT endpoint device and a multi-media architecture network pass;
assigning a predefined custom indicia for each of the one or more legacy communication network services, for use on said PTT endpoint device; and
receiving in the enhanced proxy said predefined custom indicia from said PTT endpoint device to invoke said enhanced proxy to provide a signal for a selected one of said legacy communication network services to said multi-media architecture network;
wherein said multi-media architecture network is in operative communication with said legacy communication network to request said selected one of said legacy communication network services and provide a response to the PTT endpoint device through said enhanced proxy;
wherein the one or more legacy communication services includes at least one of: an operator service, whereby a user of said PTT endpoint device is able to talk to an operator; and a voicemail messaging service, whereby said user of said PTT endpoint device is able to utilize voicemail messaging functions.

2. The method of claim 1, wherein the PTT endpoint device registers as a participant with the enhanced proxy.

3. The method of claim 2, wherein said enhanced proxy registers on said multi-media architecture network to access to said legacy communication network, to provide access to participating PTT endpoint devices.

4. The method of claim 3, wherein said enhanced proxy accesses two or more of said legacy communication networks, and wherein said two or more legacy communication networks are provided by one or more carriers.

5. The method of claim 3, wherein the legacy communication network is a public switched telephone network (PSTN).

6. The method of claim 5, wherein said multi-media architecture network is an Internet Protocol (IP) Multi-media Subsystem Third Generation (IMS 3G) network domain, the method further comprising:
utilizing an edge proxy, for performing call control in said IMS domain; and
utilizing a media gateway to interface between said IMS domain and said PSTN.

7. The method of claim 6, wherein said enhanced proxy represents the PTT endpoint device to said edge proxy, whereby said enhanced proxy handles Session Initiation Protocol (SIP) registration and transparently provides handset presence for the PTT endpoint device.

8. The method of claim 7, wherein said one or more services is an operator service, wherein said enhanced proxy provides a real time indication to an operator on said PSTN, whereby a user of said PTT endpoint device is able to provide a predefined custom indicia associated with the operator service and immediately start talking to said operator.

9. The method of claim 7, wherein said one or more services is voicemail messaging, wherein said enhanced proxy provides an indication to said PSTN to cause access to voicemail messaging, whereby a user of said PTT endpoint device is able to utilize voicemail messaging functions.

10. The method of claim 1 further comprising:
utilizing the PTT endpoint device as a delivery mechanism for information that is specific to an end-user of the PTT endpoint device;
wherein a session between the PTT endpoint device and the multi-media architecture network occurs on a communication channel and passes through said enhanced proxy;
obtaining in said enhanced proxy, one or more informational items about the end-user; and
utilizing said one or more informational items to dynamically provide information that is customized to the end-user.

11. The method of claim 10, further comprising monitoring usage and available bandwidth of said communication channel, during said session, whereby said one or more informational items may be transparently requested by the enhanced proxy during said session between the PTT end-point device and the multi-media architecture network.

12. The method of claim 10, wherein said information that is customized to the end-user is a picture, and said picture is provided as an attachment to other communication data.

13. The method of claim 12, wherein said session is an ordinary call flow, wherein said one or more informational items are piggy-backed on messages relating to said call flow and unused portions of the communication bandwidth are utilized to transport said one or more informational items.

14. The method of claim 13, wherein said one or more informational items pertain to the end-user's profile.

15. The method of claim 13, wherein said one or more informational items pertain to the end-user's current physical location.

16. The method of claim 13, wherein said one or more informational items is real time data.

17. A system for providing a Push-to-talk (PTT) endpoint device with transparent access to one or more end-user services that are available on a legacy communication network, comprising
a multi-media architecture network, having a gateway to interface said multi-media architecture network to the legacy communication network; and
an enhanced proxy for integrated voice over internet protocol (VoIP) applications (enhanced proxy);
wherein said enhanced proxy provides a transparent conduit for all communications between the PTT endpoint device and said multi-media architecture network;
wherein said enhanced proxy selectively traps and processes selective ones of said communications, whereby a PTT request for a legacy network service can be handled by the enhanced proxy, wherein the enhanced proxy appears as a legacy communication network device to said legacy communication network during the request for said legacy communication network service, and then appears as a PTT network or server when providing said legacy communication network service to said PTT endpoint device;
wherein said legacy network service is one of: an operator service, whereby a user of said PTT endpoint device is able to talk to an operator; and a voicemail messaging service, whereby said user of said PTT endpoint device is able to utilize voicemail messaging functions.

18. The system of claim 17, wherein said legacy communication network is a public switched telephone network (PSTN).

19. The system of claim 18, wherein said multi-media architecture network is an Internet Protocol (IP) Multi-media Subsystem Third Generation (IMS 3G) network domain comprising:
- a Call Service Control Function (CSCF) for performing call control in said IMS domain; and
- a Gateway for interfacing between said IMS domain and said PSTN.

20. A non-transitory computer readable medium having computer executable instructions to implement a method for providing to a Push-to-talk (PTT) endpoint device access to one or more services that are available on a legacy communication network, the method comprising:
- providing an enhanced proxy for integrated voice over internet protocol (VoIP) applications through which all communications between the PTT endpoint device and a multi-media architecture network pass;
- assigning a predefined custom indicia for each of the one or more legacy communication network services, for use on said PTT endpoint device; and
- receiving in the enhanced proxy said predefined custom indicia from said PTT endpoint device to invoke said enhanced proxy to provide a signal for a selected one of said legacy communication network services to said multi-media architecture network;
- wherein said multi-media architecture network is in operative communication with said legacy communication network to request said selected one of said legacy communication network services and provide a response to the PTT endpoint device through said enhanced proxy;
- wherein the one or more legacy communication services includes at least one of: an operator service, whereby a user of said PTT endpoint device is able to talk to an operator; and a voicemail messaging service, whereby said user of said PTT endpoint device is able to utilize voicemail messaging functions.

21. A computing system having a processor, a memory and an operating environment, the computer system operable to execute a method for providing to a Push-to-talk (PTT) endpoint device access to one or more services that are available on a legacy communication network, the method comprising:
- providing an enhanced proxy for integrated voice over internet protocol (VoIP) applications through which all communications between the PTT endpoint device and a multi-media architecture network pass;
- assigning a predefined custom indicia for each of the one or more legacy communication network services, for use on said PTT endpoint device; and
- receiving in the enhanced proxy said predefined custom indicia from said PTT endpoint device to invoke said enhanced proxy to provide a signal for a selected one of said legacy communication network services to said multi-media architecture network;
- wherein said multi-media architecture network is in operative communication with said legacy communication network to request said selected one of said legacy communication network services and provide a response to the PTT endpoint device through said enhanced proxy;
- wherein the one or more legacy communication services includes at least one of: an operator service, whereby a user of said PTT endpoint device is able to talk to an operator; and a voicemail messaging service, whereby said user of said PTT endpoint device is able to utilize voicemail messaging functions.

22. A method for communicating between two or more Push-to-talk (PTT) endpoint devices, the method comprising:
- providing an enhanced proxy for integrated voice over internet protocol applications;
- registering said two or more PTT endpoint devices with said enhanced proxy;
- receiving at said enhanced proxy all communication packets passing between said two or more PTT endpoint devices during a communication session;
- recording on a storage device in said enhanced proxy the communication packets passing between said two or more PTT endpoint devices during the communication session; and
- providing call rejoining to said PTT endpoint device, wherein said enhanced proxy maintains a connection on behalf of a dropped endpoint device and utilizes the stored communication packets to allow at least one of rejoin and playback of missed communication packets;
- wherein said enhanced proxy stands in for a recipient of one of said two or more end point devices during said communication session to provide a communication link.

23. The method of claim 22 further comprising providing call waiting functions to said PTT endpoint device, wherein said enhanced proxy provides a notification to the recipient one of said two or more end point devices to indicate an incoming request for a connection.

24. The method of claim 22 further comprising, providing through said enhanced proxy, network bypassed communication between said two or more endpoint devices, whereby communication packets are directly routed to participating ones of said two or more endpoint devices.

* * * * *